(12) United States Patent  (10) Patent No.: US 8,958,267 B2
Eick et al.  (45) Date of Patent: Feb. 17, 2015

(54) SEISMIC TRUE ESTIMATED WAVELET

(75) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 501 days.

(21) Appl. No.: 13/469,857

(22) Filed: May 11, 2012

(65) Prior Publication Data

US 2012/0287755 A1   Nov. 15, 2012

Related U.S. Application Data

(60) Provisional application No. 61/486,022, filed on May 13, 2011.

(51) Int. Cl.
G01V 1/00 (2006.01)

(52) U.S. Cl.
USPC .............................................. 367/41; 702/17

(58) Field of Classification Search
USPC ................... 367/41, 46, 73; 702/17
See application file for complete search history.

(56) References Cited

U.S. PATENT DOCUMENTS

| | | | |
|---|---|---|---|
| 5,703,833 A | 12/1997 | Allen | |
| 5,715,213 A | 2/1998 | Allen | |
| 5,719,821 A | 2/1998 | Sallas et al. | |
| 5,790,473 A | 8/1998 | Allen | |
| 6,161,076 A | 12/2000 | Barr et al. | |
| 7,107,159 B2 | 9/2006 | German | |
| 7,295,490 B1 | 11/2007 | Chiu et al. | |
| 7,333,393 B2 | 2/2008 | Vossen et al. | |
| 7,436,734 B2 | 10/2008 | Krohn | |
| 7,515,505 B2 | 4/2009 | Krohn et al. | |
| 7,636,275 B2 | 12/2009 | Annon et al. | |
| 2010/0004870 A1 | 1/2010 | Tonellot et al. | |
| 2011/0194378 A1* | 8/2011 | Decker et al. | 367/40 |
| 2012/0044784 A1* | 2/2012 | Pierle | 367/38 |

OTHER PUBLICATIONS

Allen, et al. "High Fidelity Vibratory Seismic (HFVS) Method for Acquiring Seismic Data" 1998 SEG Expanded Abstracts (1998).
Mewhort, et al., "Does It Matter What Kind of Vibroseis Deconvolution is Used?" CSEG Geophysics (2002).

* cited by examiner

*Primary Examiner* — Mark Hellner
(74) *Attorney, Agent, or Firm* — ConocoPhillips Company

(57) ABSTRACT

The invention relates to processing seismic data that includes signals from at least two sources and typically three or four sources where source separation is necessary for geophysical analysis. Specifically, the present invention is a process for correcting data prior to inversion where the correction is provided to correct for the filtering effect of the earth. The earth is a non-homogenous seismic propagator that causes distortions of wavelets of seismic energy related to the source and receiver azimuth and offset that makes the identification of source specific data within the composite data harder to identify. Computing an earth response and correcting for the effects of the earth on the wavelets provides for more resolution and more clarity in the resulting data and better geophysical interpretation.

5 Claims, 3 Drawing Sheets

SEISMIC TRUE ESTIMATED WAVELET

CROSS-REFERENCE TO RELATED APPLICATIONS

This application is a non-provisional application which claims benefit under 35 USC §119(e) to U.S. Provisional Application Ser. No. 61/486,022 filed May 13, 2011, entitled "SEISMIC TRUE ESTIMATED WAVELET," which is incorporated herein in its entirety.

STATEMENT REGARDING FEDERALLY SPONSORED RESEARCH

None.

FIELD OF THE INVENTION

This invention relates to seismic exploration and particularly to processing seismic data created by recording seismic energy received by seismic receivers based on energy input into the ground using seismic sources.

BACKGROUND OF THE INVENTION

There are a variety of source types for delivering seismic energy into the earth. Each type of seismic source provides seismic energy that has common characteristics that can be observed in the data record. However, it is generally desired that seismic sources used in a survey are operable to create distinguishable characteristics so that the data record may be inverted for source separation. The raw data typically includes far more information than can be analyzed by the most powerful computers, so the data is processed to draw out the pertinent features for computer analysis.

An early processing step is source separation of the data record to identify the signals originating from each source and separating those signals from one another. A following step is de-signaturing each separate signal into a single spike of energy. The single spike represents the cumulation of the reflected signal from a substructure. A routine seismic survey will create a tremendous number of spikes. Even with the simplifying of the data by de-signaturing into a single spike, the computer processing for a routine survey is still quite substantial.

These processes of source separation and de-signaturing data is done regardless of whether the source signal is a land survey or marine survey, whether the sources are vibrators which typically create sweeps of seismic energy or elastic wave generators that produce impulsive signals similar to explosives, or an airgun array such as used offshore or a marine vibrator which are used occasionally to produce a sweep of energy.

Source separation is aided by sources that have profoundly different characteristics. However, it is more common to use similar sources throughout a survey, where the distinguishing characteristics of individual sources are typically not highly distinctive. Therefore, an accurate understanding of the characteristics of the seismic signal from each source that was applied at each source point location can substantially aid in source separation. Higher precision of the characteristics for the seismic source signal inputted into the earth provides higher precision in source separation.

As an example of how energy is input into the ground, in the process of acquiring land seismic data, it is conventional to use a seismic vibrator to input seismic energy into the ground. Seismic energy is generally applied over time where the vibrators begin a sweep by vibrating initially at a low frequency and progressively increase the frequency such that an entire sweep of the frequency range is delivered within a definite time. Sweeps of four to eight seconds have been standard practice for years, but longer sweeps are becoming increasingly common with twenty-four second sweeps and forty-eight second sweeps also being used.

The costs for a seismic survey can be quite expensive and much effort has gone into improving the efficiency of seismic surveying. One advance is to operate several seismic vibrators at the same time all making a similar sweep, but at different phases with respect to one another. In other words, if the baseplate of one vibrator were to be going up while another is going down, the two vibrators would be about 180 degrees out of phase. Operating four vibes that are out of phase with respect to one another is known and commercially in use as the high fidelity vibroseis ("HFVS") or ZenSeis® geophysical prospecting systems among others. Thus, commonly four (or some other number of) vibrators can be delivering seismic energy at one time and are each identifiable in the recordings from all of the seismic receivers. Typically, with four vibrators, at least four separate sweeps are performed where the phase relationship between the vibrators is changed between sweeps to enhance the distinctiveness and identifiably of each vibrator in the data record.

With distinctive and identifiable sweeps, the problem then becomes one of time and effort efficiency for separating out the individual shot records from the composite data set. For HFVS and ZenSeis® system, the approach is by inversion and separation of the data using a source signal. The common technique in the industry is to use the ground force estimate provided by the vibe controller as a proxy for the true source signal. The problem is that the true vibe source signal is not precisely known. This leads to imperfect separation and poor resultant separated data. The fidelity of the inverted and separated data is a function of the precision of the proxy source signal. The more accurate the proxy source signal, the signals will be more accurately separated by source and the output will be higher quality. Thus, the issue then becomes: what is the true source signal? or how can a more accurate proxy source signal be obtained?

The land example above demonstrates some of the reasons that the source signal needs to be accurately known for the best results in high production vibratory sourcing techniques. The same concerns apply to land impulsive sources and to marine cases with airgun arrays and with marine vibrators.

BRIEF SUMMARY OF THE DISCLOSURE

The invention more particularly relates to a method of optimizing the separation of composite seismic data that includes signals from two or more seismic sources. The method more particularly includes the acquisition of seismic data to create a data set for a survey area. An initial source wavelet is identified and an expected response to the initial source wavelet by one or more seismic receivers taking into consideration the geometric relationship of the receivers to the source is identified. A computed earth response is created for each source and receiver pair based on the geology between the source and receiver and the computed earth response is applied to the expected response to the initial source wavelet to create a source true estimated wavelet for each source receiver pair. The source true estimated wavelet is then used for at least one further processing step of the acquired data set such as inverting, separating, de signaturing or wavelet de convolving.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

This invention relates to a process to separate simultaneously or near simultaneously activated seismic data sources where the separation method requires as one component that the seismic source signature be uniquely or distinctly coded in some manner. This includes data that comprises signals from at least two sources and typically three or four sources where source separation is necessary for geophysical analysis. Specifically, the present invention is a realization that the wavelet viewed by each seismic signal sensor location or receiver location is a function of the original wavelet delivered into the earth convolved with the earth filtering response. A more accurate identification of a wavelet as to its source leads to more accurate data set interpretation of the source-receiver pair data and ultimately leads to higher resolution or more accurate interpretation of the subsurface structures.

Figure 1:
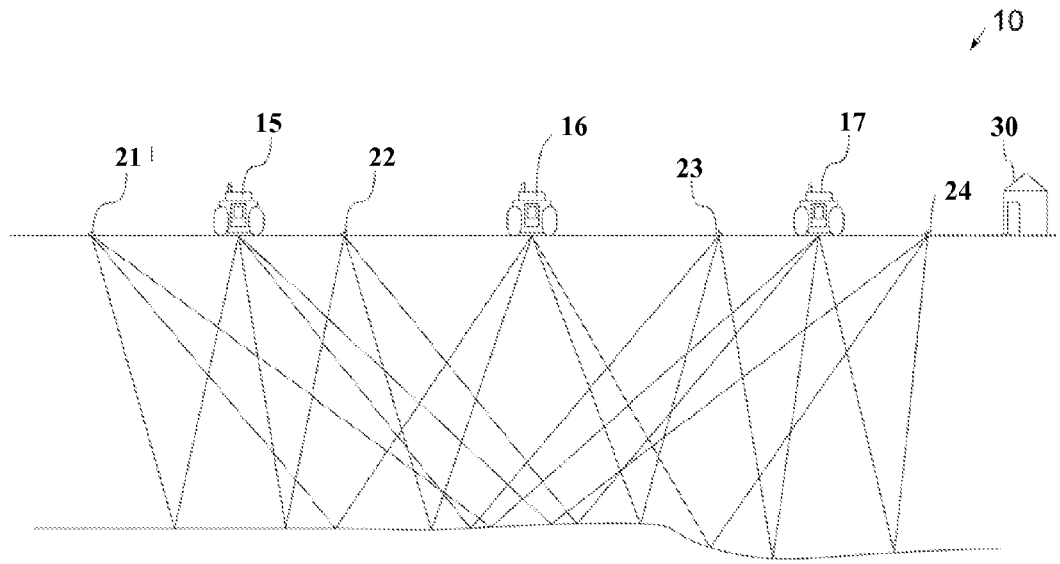
FIG. 1 is a fragmentary, cross-sectional view of the earth with three vibratory seismic sources emitting seismic energy into the earth and recording the returning wavefield at four receiver locations.

As shown in FIG. 1, a land example seismic acquisition system 10 is shown comprising three seismic vibrators 15, 16 and 17 along with receivers 21, 22, 23, and 24. All of the receivers 21-24 provide the received signals to recording system 30 either by direct hard wire as it is received or by download sometime after the recorded event such as in the case of autonomous node type recorders. The acquisition system 10 as shown is a simple representation of the source and receiver configuration used for a typical seismic acquisition project using the HFVS or ZenSeis® geophysical prospecting systems where the sources are activated simultaneously or near simultaneously creating a composite seismic record with all sources contributing. In such methods each source must be activated as many times at the same location as there are sources that will be activated simultaneously or near simultaneously creating a composite seismic record of each activation. These composite seismic records along with an estimated source signature, typically a computed ground force estimate, are input to an inversion program that separates the composite seismic records into separated records of seismic data arriving at a receiver or sensor location and originating principally from only one of the activated sources. Basically, the output of the inversion is one seismic data record for each activated source. Unfortunately, a data record typically includes energy from sources at other locations. After inversion, the errant energy can be visually recognized to some extent in each of the other seismic data records after inversion. This is referred to as source generated data contamination and is not desirable.

Starting at the source locations, each of the seismic sources delivers a series of wavelets that are unique, but not necessarily highly distinctive. For example, each of the sources may provide a common sweep from a specific low frequency to a specific high frequency at the same time, but each sweep is offset in phase relative to the others such that the plate of one vibe is moving downwardly and near the bottom end of its downward movement while another is midway moving up and the third is either pausing at the top and beginning to move downward. While the wavelets are similar, the phase differences can be identified in the data set and generally resolved into source receiver pairs as described above. However, the earth creates a filtering effect on the wavelets that distorts the wavelets slightly. So, by the time the receivers capture the signals, the wavelets are different than from what was originally delivered into the ground, increasing the proportion of source generated contamination in each data record.

Other aspects of delivering seismic energy into the earth create imperfections in the signals recorded at the various recording stations in the survey area. For example, most sources do not deliver a seismic signal that is uniform in all directions. The signals may be stronger or have greater fidelity to what the vibe controller records as having been delivered into the ground out in front of the vibe and behind the vibe, but may be weaker directly to the sides and be further different at other angles relative to the orientation of the vibe truck. Secondly, the actual geometry of the source receiver pairs creates an array effect in 3D that is typically ignored, but alters the distinction of the signals. For example, two receivers that are side by side and about equal distant from the vibe and sufficiently distant to have a very similar orientation angle from the vibe will likely receive the reflected signals at very close to the same time. However, if the receivers are at different distances (different offset) from the vibe, even if otherwise a small distance, such as 25 meters, there is a slight, but not necessarily insignificant time lag. Finally, the earth itself alters or attenuates the signals in route from source to receiver. Factoring these aspects into the data that is recorded, or in other words, using an inversion algorithm with a source signal estimate that has been corrected for each of these error inducing factors, provides improved resolution of the final product by improving source separation. Improved source separation comes by understanding the effects of the forgoing described issues and analyzing the data to obtain a more accurate source true estimated wavelet or STEW.

Figure 2:
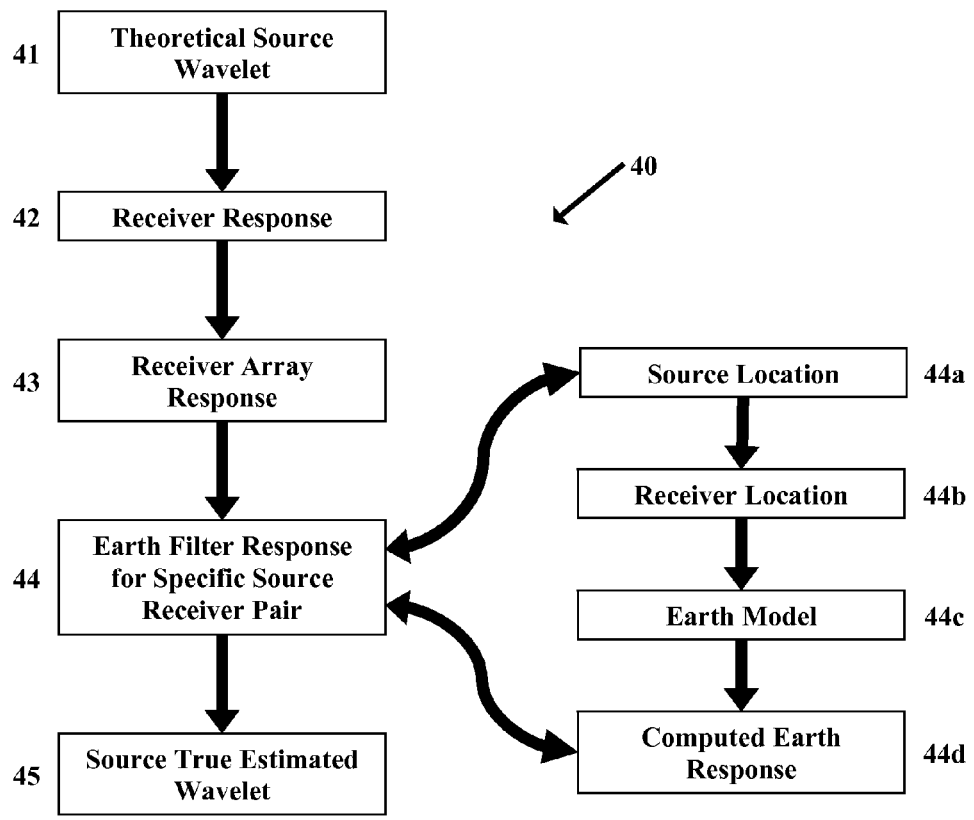
FIG. 2 is a flow chart showing a first embodiment of the process of the present invention.

Referring now to FIG. 2, a process 40 for identifying the STEW begins with creating a model or theoretical source wavelet that a source would ideally deliver into the ground as shown in Step 41 or Box 41.

The theoretical source wavelet is received by a theoretical receiver and the response is calculated as shown in the step shown in Step 42. This step includes consideration of the orientation of the receiver relative to the source noting that sources and receivers have directional bias such that the signal delivered by a source is not precisely uniform in all compass directions. Similarly, receivers commonly have bias depending on their orientation relative to the source. This is a critical insight in that most if not all sources are somewhat directional and most if not all receivers are directional.

The time lag issues are also considered and modeled by computer based on the array effect of the receiver locations relative to each other and to the source as shown in Step 43. The array effect may also be viewed as a directional bias, especially when considering multi-element arrays which can be highly directional by design. By not considering the actual array effects of the source and receiver, the data is compromised.

Noting that the earth's surface is not a homogeneous seismic signal propagator, the wavelet actually received by each receiver and by the array is altered both in azimuth and in offset as a function of the geometry of the source to receiver pathway and the earth filter the energy has to propagate through. Azimuth and offset variations may easily obscure the applied phase distinction between the sources since the seismic signal propagation is through different paths in the earth. This will obscure the identity of a source in the data set and will contribute to a smearing of the resultant signal during inversion and separation. Thus, the Earth Filter Response is calculated as shown in Step 44 and then applied to the computed receiver response computed at Step 42 and modified at Step 43 for the theoretical source wavelet delivered at Step 41. The Earth Filter Response as shown in Step 44 takes into consideration the geology between the source location and the receiver location including the subsurface geology as represented by the Earth Model as shown in Step 44c. The Computed Earth Response for each source receiver pair is calculated in Step 44d using the propagation of energy through the Earth Model utilizing the appropriate geometric locations. A simple method is to propagate a known wavelet through the Earth Model and compare the resulting wavelet to the input wavelet then compute the transformation operator that will be the Computed Earth Response. One method for modeling the propagation of the energy through the Earth Model is by using two-way wave equation formulations that can be acoustic or elastic depending on the nature on the geology. A solution to the equations can be found by many different methods such as finite difference or finite element methods. These techniques are widely utilized in seismic imaging processes. The Computed Earth Response is then applied to the source wavelet in Step 44 and the resulting source wavelet becomes the Source True Estimated Wavelet for the given source and receiver pair. The process 40 is repeated for every source and receiver pair in the seismic survey with the potential for a unique Source True Estimated Wavelet occurring for each source receiver pair.

The resulting set of Source True Estimated Wavelets are then used in the processing of simultaneous or near simultaneous seismic source acquisition to improve the resulting individual source data records. In the inversion, separation, designature or wavelet de-convolution processing the match of the Source True Estimated Wavelet to the actual source wavelet as observed by the signal receiver is critical. Modifications to the Earth Model based on the resulting individual source data records may be required to optimize the results.

Figure 3:
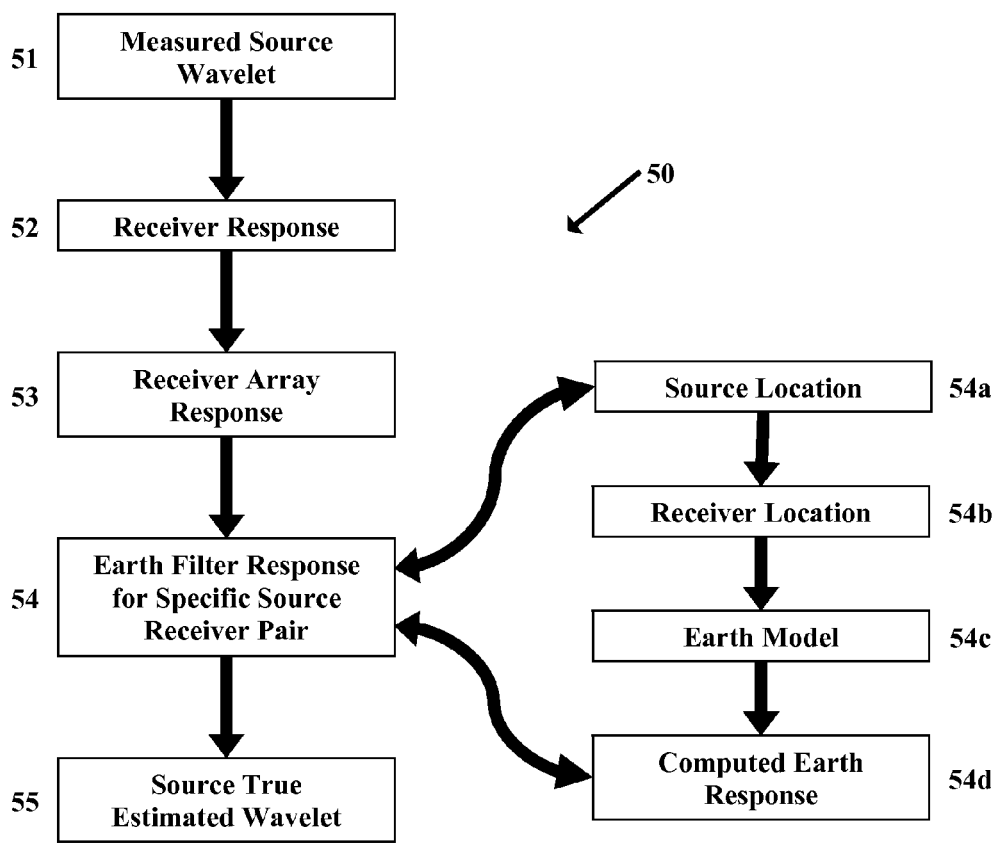
FIG. 3 is a flow chart showing a second embodiment of the process of the present invention.

The inventive process includes alternative processes such as process 50 shown in FIG. 3 where a Measured Source Wavelet is used rather than the Theoretical Source Wavelet in the process of FIG. 2. The Measured Source Wavelet comes from actual measuring of the vibratory seismic source using load cell sensors under the seismic source to acquire a measurement of the true ground force actually applied by the vibrator. With the Measured Source Wavelet as the seed, the remaining steps are essentially the same as in process 40 where the geographical orientations of the sources and receivers including any array effects are computed along with earth filter considerations of the geology that the wavelets are expected to transcend. The Source True Estimated Wavelet includes data for source separation that is pertinent for each source receiver pair and which takes into account the expected alterations to the energy as it transcends from the source to each receiver.

Figure 4:
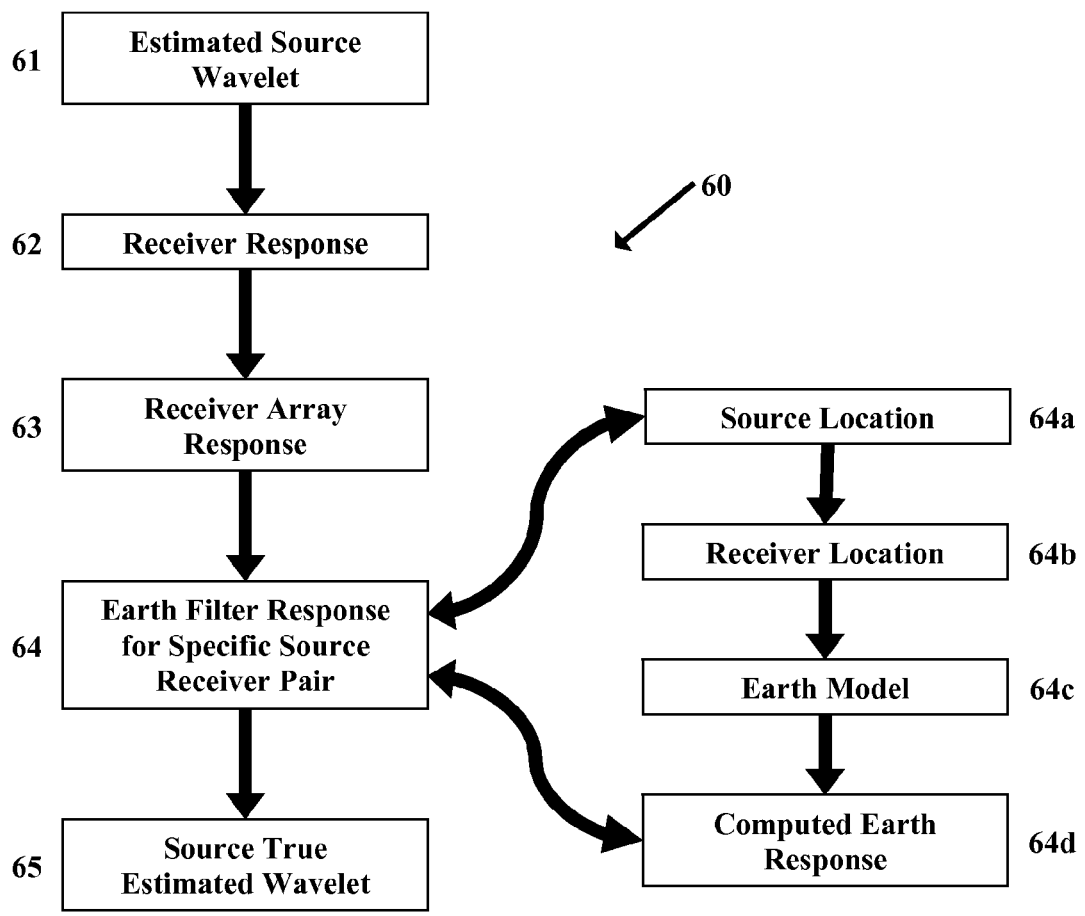
FIG. 4 is a flow chart showing a third embodiment of the process of the present invention.

A third alternative process 60 is shown in FIG. 4 where the Estimated Source Wavelet is provided by the sweep vibrator seismic source's electronics. The Estimated Source Wavelet is computed from standard sensor measurements taken by the vibrator controlling electronics and then recorded. This information only takes into account the signal at the source and does not take into account the effects of the orientation of the source, the orientation and geometry of the receivers relative to one another and to the source and the geology that the energy transcends from source to receiver. The computations and calculations for taking these factors into consideration are essentially the same as in process 40, but provide a considered tool for source of the seismic data.

Acquisition techniques such as HFVS (U.S. Pat. Nos. 5,550,786, 5,715,213, and 5,721,710), ZenSeis® geophysical prospecting systems (U.S. Pat. No. 7,295,490), Unique Composite Relatively Adjusted Pulse (U.S. Ser. No. 61/365,631, filed Jul. 19, 2010) and Continuous Composite Relatively Adjusted Pulse (U.S. Ser. No. 61/365,663, filed Jul. 19, 2010), all of which are incorporated herein, are examples of acquisition techniques that utilize coded source signatures to aid in the separation of usable seismic data resulting from the simultaneously or near simultaneously activation of multiple seismic source. The seismic acquisition methods Unique Composite Relatively Adjusted Pulse and Continuous Composite Relatively Adjusted Pulse used pulse sources to encode unique source signatures. The examples of HFVS and ZenSeis® geophysical prospecting systems utilize vibrator type sources and are better known in industry and are the easiest examples of the application of this present invention. For this reason vibrator energy sources will be used as the example for explaining this invention, but it should be understood that the invention is applicable to any type of multiple encoded seismic source system where source separation is to be accomplished.

In the simplest embodiment of the invention, the ground force estimate data produced by the vibrator control electronics during the vibrator operation is seeded as the theoretic source wavelet. Next the theoretic array response of each of the receivers is calculated. The next step is to compute the earth response for a given source and receiver pair. For this the actual source and receiver locations are used with the Earth Model to estimate the computed earth response. One method for this is to propagate a known wavelet through the Earth Model, compare the propagated wavelet to the input wavelet and compute the transformation operator, the computed earth response. This estimate of the computed earth response is then applied along with the receiver responses to the Estimated Source Wavelet to create the Source True Estimated Wavelet. The seismic data being processed can be inverted, separated, designatured or wavelet de-convolved using the Source True Estimated wavelet. If desired, the results can be examined for artifacts. Artifacts can be analyzed and the model refined and the process repeated until a quality limit is reached. Once this has occurred, the process is repeated on the next source and receiver pair until the dataset is completed.

Recognizing the filter effects of the earth and computing an earth correction response to use in processing and analyzing the data provides an improved tool for higher resolution and clarity.

The embodiments listed concentrate on correcting the frequency dependent phase, amplitude and frequency errors that has been identified as a major factor in the level of source generated data contamination observed in data acquired using HFVS, ZenSeis® geophysical prospecting systems or similar seismic acquisition methods. Other simultaneous or near simultaneous acquisition methods that use source signature data as an integral part to an inversion or other source separation method can benefit from this earth filter correction method.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of optimizing the separation of composite seismic data that includes signals from two or more seismic sources wherein the method comprises:
   a) acquiring seismic data to create a data set for a survey area;
   b) identifying an initial source wavelet;
   c) identifying an expected response to the initial source wavelet by one or more seismic receivers taking into consideration the geometric relationship of the receivers to the source;
   d) creating a computed earth response for each source and receiver pair based on the geology between the source and receiver;
   e) apply the computed earth response to the expected response to the initial source wavelet to create a source true estimated wavelet for each source receiver pair; and
   f) using the source true estimated wavelet for at least one further processing step of the acquired data set such as inverting, separating, de-signaturing or wavelet de-convolving.

2. A method of source separating composite seismic data that includes signals from two more seismic sources in accordance with claim 1, wherein the initial source wavelet is a theoretical source wavelet.

3. A method of source separating composite seismic data that includes signals from two more seismic sources in accordance with claim 1, wherein the initial source wavelet is an estimated source wavelet provided by the seismic source.

4. A method of source separating composite seismic data that includes signals from two more seismic sources in accordance with claim 1, wherein the initial source wavelet is a measured source wavelet acquired by measuring the signal delivered by the seismic source.

5. A method of source separating composite seismic data that includes signals from two more seismic source in accordance with claim 1 wherein the step of identifying the expected response to the initial source wavelet includes taking into consideration the geometrical relationship of the receivers to one another.

* * * * *